(12) United States Patent
Nakhjavani

(10) Patent No.: US 10,147,321 B1
(45) Date of Patent: Dec. 4, 2018

(54) PARKING EXCHANGE APPLICATION

(71) Applicant: Omid B. Nakhjavani, Kirkland, WA (US)

(72) Inventor: Omid B. Nakhjavani, Kirkland, WA (US)

( * ) Notice: Subject to any disclaimer, the term of this patent is extended or adjusted under 35 U.S.C. 154(b) by 0 days.

(21) Appl. No.: 15/836,663

(22) Filed: Dec. 8, 2017

Related U.S. Application Data

(60) Provisional application No. 62/534,659, filed on Jul. 19, 2017.

(51) Int. Cl.
| | | |
|---|---|---|
| *G06Q 30/08* | (2012.01) | |
| *G08G 1/14* | (2006.01) | |
| *G06Q 10/02* | (2012.01) | |
| *H04M 1/725* | (2006.01) | |
| *G06Q 20/32* | (2012.01) | |
| *G01S 19/14* | (2010.01) | |

(52) U.S. Cl.
CPC .............. *G08G 1/144* (2013.01); *G01S 19/14* (2013.01); *G06Q 10/02* (2013.01); *G06Q 20/3223* (2013.01); *G08G 1/143* (2013.01); *G08G 1/147* (2013.01); *H04M 1/72522* (2013.01)

(58) Field of Classification Search
CPC .......... G08G 1/143; G08G 1/14; G08G 1/144; G01C 21/36; G01S 19/14; G06Q 10/02
USPC .................. 340/932.2; 705/13; 701/400, 533
See application file for complete search history.

(56) References Cited

U.S. PATENT DOCUMENTS

| | | | | |
|---|---|---|---|---|
| 2003/0162536 A1* | 8/2003 | Panico | ..................... | G08G 1/14 455/456.3 |
| 2007/0008181 A1* | 1/2007 | Rollert | ................... | G06Q 10/02 340/932.2 |
| 2010/0302068 A1* | 12/2010 | Bandukwala | ............ | G08G 1/14 340/932.2 |
| 2015/0279213 A1* | 10/2015 | Balter | .................... | G08G 1/144 705/13 |
| 2016/0253748 A1* | 9/2016 | Levy | ...................... | G06Q 10/02 705/13 |

* cited by examiner

*Primary Examiner* — Firmin Backer
*Assistant Examiner* — Munear T Akki
(74) *Attorney, Agent, or Firm* — Farid Piroozmandi

(57) ABSTRACT

A parking exchange application method and system for securing an available parking space on a street corner. A responding driver in a car temporarily occupies an available parking space and informs a central processing database of the address of the available parking space. A requesting driver searching for an available parking space in a location vicinity, transmits a request to the central processing database. The central processing database compiles a list of available parking spaces addresses, and the requesting driver selects one of the available parking spaces, and drives toward the selected available parking space. Upon arrival, the central processing database makes payments of a transfer fee to the requesting drive, in exchange for the selected available parking space, and a commission fee to the parking exchange application, from an authorized fee payment from the requesting drivers, and the requesting driver occupies the available parking space.

21 Claims, 13 Drawing Sheets

PARKING EXCHANGE APPLICATION

Selecting an available parking space and authorizing required fee

Responding driver #1
Available parking space address: 1001 3rd Ave., Seattle, WA
Required fee: $3.00

Credit Card Information
Card number: 1234567890123456
CVV: 123
Expiration: 01/22

[Select]

*Fig. 9*

PARKING EXCHANGE APPLICATION

List of Available Parking Spaces 1. 2012 Brown Honda Civic
License # WA GHI9101
1001 3rd Ave., Seattle, WA
$3.00 to release available parking space 2. 2014 Blue Toyota Camry
License # WA ABC1234
109 Marion St., Seattle, WA
$5.00 to release available parking space 3. 2007 Red Nissan Leaf
License # WA DEF5678
452 Madison St., Seattle, WA
$8.00 to release available parking space

*Fig. 8*

PARKING EXCHANGE APPLICATION

RELATED APPLICATIONS

This application claims priority under 35 U.S.C. § 119 to U.S. Provisional Application No. 62/534,659 filed on Jul. 19, 2017, the entire contents of which are incorporated herein by reference.

FIELD OF DISCLOSURE

The present disclosure relates to methods and systems assisting in securing a parking space on a street for an automobile, and in particular, to a system and software application enabling a standby driver in a car temporarily occupying an available parking space to release the parking space to a driver looking for the same in exchange for a fee.

BACKGROUND OF THE DISCLOSURE

In most metropolitan cities, it is difficult to find street corner parking space close to where a driver needs to be. Most often drivers who have been circling around the vicinity of where they need to be in search of a parking space, eventually give up and opt for parking in a parking structure for a high hourly rate with a minimum required number of hours charged regardless of if they just need a fraction of an hour parking to accomplish their business.

There are software applications available, where a driver can use their smart phone or an application on their vehicle computer, which provides the driver with addresses of parking lots and parking structures proximate to business centers. However, the location of these parking facilities are fixed and they are not always a convenient place both financially and where they are located as for where the driver needs to conduct her business.

In general a majority of drivers tend to prefer a street parking space close to where they need to be, which is preferably free of charge, or if they need to pay for parking on the street, they can limit the charges to just the duration that they need to finish their business. However, due to nature of street parking where it is based on a first come first to occupy the available parking space it is difficult to arrange for a street parking within a specific time period that works with a potential business appointment. As such a driver who wishes to be at a meeting in a certain time usually cannot depend on finding a street parking space in a timely manner, and either has to allocate a substantial time for searching for and finding a street parking space well ahead of her meeting time, or has to restore to parking in the closest parking facility with a high hourly charge and then walk the distance to where the meeting is taking place.

There is a need for a system that can assist drivers in finding an available parking space in business centers and down town areas in metropolitan cities in a timely manner.

SUMMARY OF THE DISCLOSURE

To assist drivers in finding an available parking space in business centers and down town areas in metropolitan cities in a timely manner, present disclosure details a system and associated software application which will enable a driver to find and secure an available parking space in a timely manner.

This disclosure details a method for securing an available parking space on a street corner, where a responding driver in a car temporarily occupies an available parking space and using a parking exchange application on a smart phone informs a central processing database of the address of the available parking space along with information on the responding driver car including automobile make, model year, color, and license plate number, and how long the responding driver will occupy the available parking space, in addition to a requested fee for releasing the available parking space.

A requesting driver in search of an available parking space in a location vicinity, using a smart phone with a parking exchange application installed on it, transmits a request for an available parking space in the location vicinity to the central processing database, along with information on the requesting driver car including automobile make, model year, color, and license plate number, and an offered fee for exchange for the available parking space.

The central processing database compiles a plurality of available parking spaces addresses in the location vicinity and transmits the list to the requesting driver.

The requesting driver selects one of the available parking spaces from the list, informing the central processing database of the selection, authorizing a fee including a transfer fee for the responding driver and a commission fee for the parking exchange application, and starts driving toward the selected available parking space.

The central processing database removes the selected available parking space from the available parking spaces list in the location vicinity from the database, informs the responding driver of the authorized transfer fee, and requesting driver car information. The central processing database further informs the requesting driver of the responding driver car information.

When the requesting driver arrives at the selected available parking space, the requesting driver, using the parking exchange application on the smart phone, acknowledges the responding driver car to the central processing database. The central processing database then releases the transfer fee to the responding driver and the commission fee to the parking exchange application, and the responding driver releases the available parking space to the requesting driver.

Accordingly the removal of the selected available parking space from the available parking spaces addresses list in the location vicinity is time limited and if the requesting driver does not cancel the selection of the available parking space in a predetermined time period, or does not arrive at the available parking space within a time limit, the requesting driver authorized fee portion of transfer fee is transferred to the responding driver and the commission fee portion of authorized fee is transferred to the parking exchange application. At this point the responding driver may leave the temporary occupied available parking space, or may continue the temporary occupation of the available parking space and inform the central processing database of the address of the available parking space for the next requesting driver.

Furthermore, the central processing database continuously monitors the location of the responding driver car at the selected available parking space. If the responding driver drives the responding driver car away from the selected available parking space for more than 0.2 miles before the time limit period expires and before the requesting driver acknowledges the responding driver car for completion of transaction, the central processing database will remove the selected available parking space from the database, and informs the requesting driver of unavailability of the selected available parking space and cancels requesting driver fee authorization.

In one embodiment of the present disclosure the responding and/or requesting driver cars may comprise autonomous vehicles or remotely controlled vehicles. In this embodiment the information on the vehicles, the available parking space temporarily occupied by the autonomous or remotely controlled responding car, and acknowledgment of the responding vehicle by the requesting vehicle, and other information or authorizations are transmitted to the central processing center by the autonomous or remotely controlled vehicles.

As it relates to the requested fee for release of the available parking space by the responding driver, in addition to the responding driver indicating the requested fee, the central processing center may make fee suggestions to the responding driver based on demand for the available parking space through analysis of local traffic flow, presence of a local event attracting drivers in need of the available parking space, local ongoing construction activity limiting available parking spaces, local weather conditions, local government advisories affecting traffic flow, or a combination thereof.

The present disclosure further elaborates on the system enabling a driver in finding an available parking space in business centers and down town areas in metropolitan cities in a timely manner, detailing all the apparatus and subsystems, associated software and procedures involved in accomplishing the process.

Furthermore the present disclosure details the business aspect of the enterprise providing the system and method for assisting a driver in finding an available parking space in business centers and down town areas in metropolitan cities in a timely manner. The disclosure details how an operator of a parking exchange application may generate an income and a return on investment through collecting a commission fee from an authorized fee payment in exchange for releasing an available parking space by a responding driver temporarily occupying the available parking space to a requesting driver looking for a parking space.

BRIEF DESCRIPTION OF THE DRAWINGS

The disclosure can be better understood with reference to the following detailed description taken in conjunction with the accompanying drawings which illustrate disclosed embodiments, but which are not necessarily drawn to scale. Wherever possible, the same reference numbers will be used throughout the drawing(s) and accompanying written description to refer to the same or like part, wherein:

FIG. 8 is an illustration of the parking exchange application page on list of available parking spaces.

FIG. 9 is an illustration of parking exchange application page on selecting an available parking space and authorizing required fee.

DETAILED DESCRIPTION

Figure 1:
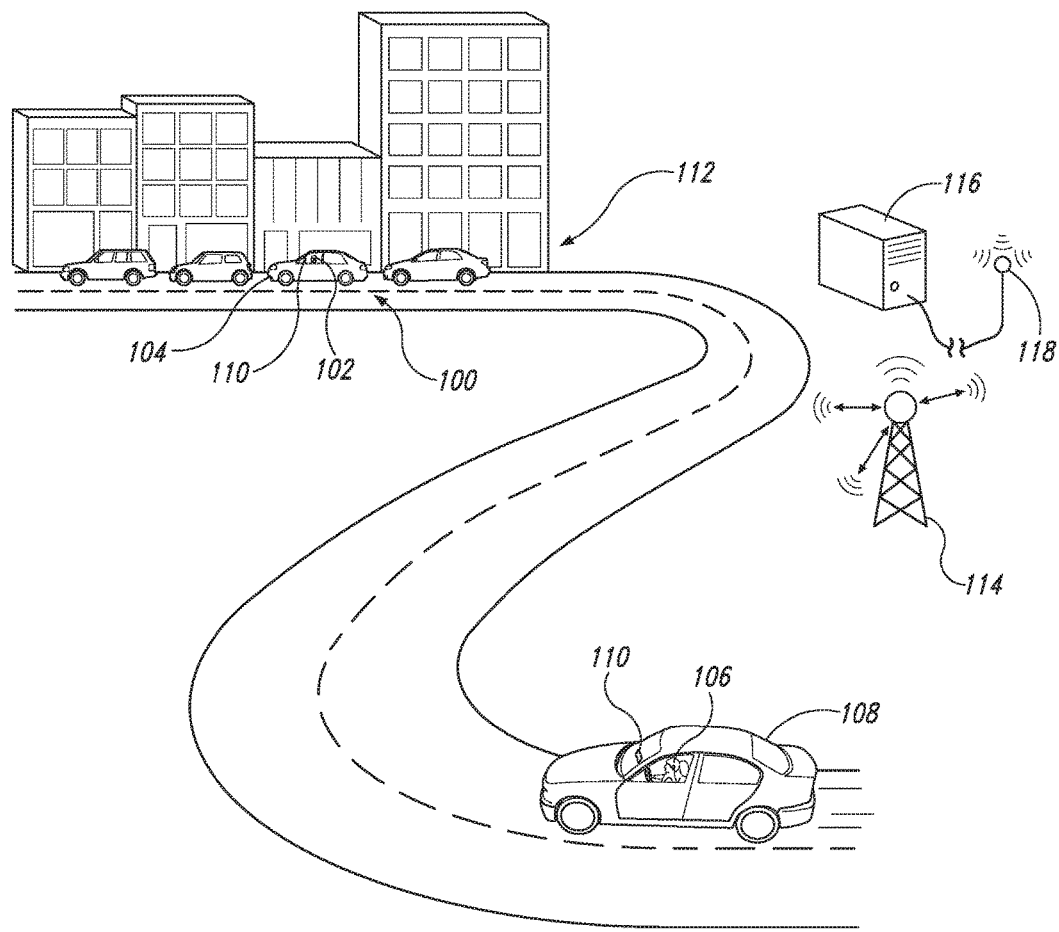
FIG. 1 is an illustration of an available parking space temporarily occupied by a responding driver, a requesting driver on her way to the parking space location vicinity, and the systems associated with the parking exchange application.

Disclosed embodiments will now be described more fully hereinafter with reference to the accompanying drawings, in which some, but not all of the disclosed embodiments are shown. Several different embodiments are provided and should not be construed as limiting the application of the disclosure to the details of construction and arrangement of the components or method of use set forth in the following description or illustrated in the following drawings as to the embodiments set forth herein. Rather, these embodiments are provided so that this disclosure will be thorough and fully convey the scope of the disclosure to those skilled in the art.

The present disclosure details a parking exchange application 608 through which a method for securing a parking space is described including a responding driver 102 in a car, temporarily occupying a parking space, and in exchange for a fee, releasing the parking space to a requesting driver 106 in a car, where the fee comprises an offered fee 604 by the requesting driver 106 and accepted by the responding driver 102, or a requested fee 702 by responding driver 102 and accepted by the requesting driver 106.

The disclosed method further indicates where the responding driver 102 informs a central processing database 116 of the temporarily occupied parking space address, the responding driver 102 requested fee 702, and a time duration 704 that the responding driver 102 will be temporarily occupying the available parking space 100, using a parking exchange application 608.

The requesting driver 106 further inquire from the central processing database 116 about available parking spaces 100 in a location vicinity 112 and provides the requesting driver 106 offered fee 604, using the parking exchange application 608.

The central processing database 116 then provides a plurality of parking space addresses on a map 602 accessible through the parking exchange application 608, occupied by responding drivers 102 and their corresponding requested fee 702$s$, in the location vicinity 112 to the requesting driver 106.

The central processing database 116 further provides the location vicinity 112 address, an estimated time of arrival of the requesting driver 106 at the location vicinity 112 address, and the offered fee 604 by the requesting driver 106 on the map 602 accessible through the parking exchange application 608 to the responding drivers 102.

The responding drivers 102 who accept the requesting driver 106 offered fee 604 transmits their acceptance to the central processing database 116.

The central processing database 116 identifies the responding drivers 102 who accept the requesting driver 106 offered fee 604 on the map 602 for the requesting driver 106.

The requesting driver 106 will select one of the responding drivers 102' available parking space address 802$es$ from the responding drivers 102 who have or have not accepted the requesting driver 106 offered fee 604.

The requesting driver 106 authorizes the fee payment 902 and drives to the selected available parking space 100.

The central processing database 116, provides information on requesting driver car 108 to the selected responding driver 102, and provides information on responding driver car 104 at the selected available parking space address 802 to the requesting driver 106.

When the requesting driver 106 arrives at the selected available parking space address 802 and acknowledges the responding driver car 104, the central processing database 116 releases a transfer fee 352 to the responding driver 102 and a commission fee 354 to the parking exchange application 608, from the authorized fee.

The responding driver 102 releases the available parking space 100 to the requesting driver 106, and the responding driver 102 and the requesting driver 106 can rate each other and the parking exchange application 608 as it relates to their satisfaction with the transaction.

As for activities of the responding driver, the method describes that the responding driver 102 using a smart phone 110 equipped with a map application 602, identifies the parking space address, uses the parking exchange application 608 informing the central processing database 116 of the parking space address, and responding driver car 104 information, and receives information from the central processing database 116 on requesting driver car 108 information and information on the transfer fee 352.

As for activities of the requesting driver, the method describes that the requesting driver 106 using a smart phone 110 equipped with the parking exchange application 608, provides information on requesting driver car 108 to the central processing database 116, inquiring from the central processing database 116 about available parking spaces 100 in the location vicinity 112, receiving the plurality of available parking spaces address 802, selecting one of the plurality of parking addresses, authorizing the fee payment 902, and upon arriving at the available parking address acknowledging the responding driver car 104.

The information on responding driver car 104 and requesting driver car 108 comprise automobile make 806, model 808, color 810, and license plate number 812.

The method further indicates that when the requesting driver 106 selects the available parking space 100, the central processing database 116 removes the selected available parking space 100 from the available parking spaces list 804 at the location vicinity 112.

The disclosed method in an embodiment details that the responding driver car 104, requesting driver car 108, or both further comprise an autonomous vehicle 356, a remotely controlled vehicle 358, or a combination thereof, and where the vehicle transmits required information to the central processing database 116 in lieu of the responding driver 102, requesting driver 106, or both.

As for the system used by the responding driver the disclosure describes that the smart phone 110 comprises a smart cellular phone 110, a tablet 206, a tablet 200, or any portable 202 or fixed 204 to an automobile computing platform able to communicate with the central processing database 116 via internet 118, satellite, cellular phone system antenna towers 114, or a combination thereof.

As for the system used by the requesting driver the disclosure describes that the smart phone 110 comprises a smart cellular phone 110, a tablet 206, a tablet 200, or any portable 202 or fixed 204 to an automobile computing platform able to communicate with the central processing database 116 via internet 118, satellite, cellular phone system antenna towers 114, or a combination thereof.

The method disclosed further details that the central processing database 116 removal of the selected available parking space 100 from the available parking spaces list 804 at the location vicinity 112 is time limited, and the requesting driver 106 authorized fee is transferred to the responding driver 102 and parking exchange application 608, if the requesting driver 106 does not cancel the selection of the available parking space 100 within a predetermined time period 360 and does not arrive at the available parking space 100 within the time limit 362.

Furthermore, the central processing database 116 continuously monitors the location of the responding driver car 104 at the selected available parking space 100. If the responding driver 102 drives the responding driver car 104 away from the selected available parking space 100 for more than 0.2 miles before the time limit 362 period expires and before the requesting driver 106 acknowledges the responding driver car 104 for completion of transaction, the central processing database 116 will remove the selected available parking space 100 from the database, and informs the requesting driver 106 of unavailability of the selected available parking space 100 and cancels requesting driver 106 fee authorization.

Present disclosure further details an embodiment representing a system for securing a parking space 500, including a responding driver 102 in a car equipped with a smart phone 110 using a parking exchange application 608, a requesting driver 106 in a car equipped with a smart phone 110 using the parking exchange application 608, and a central processing database 116 in communication with the smart phone 110 parking exchange applications 608.

The system further details that an address of an available parking space 100 temporarily occupied by the responding driver car 104, a requested fee 702 for releasing the available parking space 100, and a time duration 704 of how long the responding driver 102 will be occupying the available parking space 100, is communicated with the central processing database 116 by the responding driver 102.

A request for an available parking space 100 in a location vicinity 112 in exchange for an offered fee 604 is communicated with the central processing database 116 by the requesting driver 106.

The central processing database 116 communicates a plurality of available parking spaces address 802es in the location vicinity 112 and their corresponding requested fee 702 on a map 602 to the requesting driver 106.

The central processing database 116 further communicates with the responding drivers 102 the location vicinity 112 and time duration 606 until the requesting driver 106 will get to the location vicinity 112 on the map 602.

The central processing database 116 identifies the available parking spaces 100 where the responding driver 102 has accepted the offered fee 604 by the requesting driver 106.

The requesting driver 106 selects one of the plurality of the available parking spaces 100 in the location vicinity 112 from the responding drivers 102 who have accepted the offered fee 604 and the responding drivers 102 who have not accepted the offered fee 604, and authorizes a fee payment 902 as needed for the selected available parking space 100 release.

The central processing database 116 then removes the selected available parking space 100 from the available parking spaces list 804 in the location vicinity 112, provides the responding driver car 104 information to the requesting driver 106, and provides the requesting driver car 108 information to the responding driver 102.

The requesting driver 106 drives to the selected available parking space address 802 and upon arriving acknowledges the responding driver car 104 to the central processing database 116.

The central processing database 116 authorizes a fee transfer to the responding driver 102 and a commission fee 354 to the parking exchange application 608 from the authorized fee, and the responding driver 102 releases the available parking space 100 to the requesting driver 106.

The system description indicates that the smart phone 110 comprises a smart cellular phone 110, a tablet 206, a laptop 200, or any portable 202 or fixed 204 to an automobile computing platform able to communicate with the central processing database 116 via internet 118 and/or cellular phone system antenna towers 114.

System embodiment further details that the central processing database 116 removal of the selected available parking space 100 from the available parking spaces list 804 at the location vicinity 112 is time limited, and the requesting driver 106 authorized fee is transferred to the responding driver 102 and parking exchange application 608, if the requesting driver 106 does not cancel the selection of the available parking space 100 within a predetermined time period 360 and does not arrive at the available parking space 100 within the time limit 362.

Furthermore, the central processing database 116 continuously monitors the location of the responding driver car 104 at the selected available parking space 100. If the responding driver 102 drives the responding driver car 104 away from the selected available parking space 100 for more than 0.2 miles before the time limit 362 period expires and before the requesting driver 106 acknowledges the responding driver car 104 for completion of transaction, the central processing database 116 will remove the selected available parking space 100 from the database, and informs the requesting driver 106 of unavailability of the selected available parking space 100 and cancels requesting driver 106 fee authorization.

As an alternative embodiment of the system the responding driver car 104, requesting driver car 108, or both further comprise an autonomous vehicle 356, a remotely controlled vehicle 358, or a combination thereof, and the vehicle transmits required information to the central processing database 116 in lieu of the responding driver 102, requesting driver 106, or both.

Yet another embodiment of the present disclosure describes a business method including a parking exchange application 608 charging a commission fee 354 for securing an available parking space 100 for a requesting driver 106, and where a responding driver 102, temporarily occupying the available parking space 100, releases the available parking space 100 to the requesting driver 106 for a transfer fee 352.

Business method further details that the responding driver 102 using a smart phone 110 with the parking exchange application 608 informs a central processing database 116 of the parking space address and a requested fee 702 for releasing the available parking space 100.

The requesting driver 106 using a smart phone 110 with the parking exchange application 608 inquire from the central processing database 116 about available parking spaces 100 in a location vicinity 112 along with an offered fee 604 in exchange for the available parking space 100.

The central processing database 116 provides a plurality of parking space addresses, occupied by responding drivers 102, in the location vicinity 112 along with their corresponding requested fee 702 on a map 602 to the requesting driver 106.

The central processing database 116 further provides the location vicinity 112 and the estimated arrival time of the requesting driver 106 along with the offered fee 604 on the map 602 to the responding drivers 102.

Additionally, the central processing database identifies the available parking space address 802es of the responding drivers 102 who accept the offered fee 604 on the map 602 to the requesting driver 106.

The requesting driver 106 selects one of the plurality of parking addresses from responding drivers 102 who have accepted the offered fee 604 and the responding drivers 102 who have not accepted the offered fee 604, authorizing a fee payment 902 for release of the selected available parking space 100, and drives to the available parking space 100.

The central processing database 116, provides information on requesting driver car 108 to the responding driver 102 at the selected available parking space address 802, and provides information on responding driver car 104 at the selected available parking space address 802 to the requesting driver 106.

When the requesting driver 106 arrives at the available parking space address 802 and acknowledges the responding driver car 104, the central processing database 116 releases the transfer fee 352 to the responding driver 102 and charges the commission fee 354 for the parking exchange application 608 from the authorized fee payment 902, and the responding driver 102 releases the available parking space 100 to the requesting driver 106.

Business method further describes that the responding driver 102 using a smart phone 110 equipped with a map application 602, identifying the parking space address, uses the parking exchange application 608 informing the central processing database 116 of the parking space address, responding driver car 104 information, the requested fee 702, and receiving information from the central processing database 116 on the requesting driver car 108 information and information on the authorized fee.

Another embodiment of the business method details that the responding driver car 104, requesting driver car 108, or both further comprise an autonomous vehicle 356, a remotely controlled vehicle 358, or a combination thereof, and where the vehicle transmits required information to the central processing database 116 in lieu of the responding driver 102, requesting driver 106, or both.

As for the requesting driver functions related to the business method include the requesting driver 106 using the smart phone 110 equipped with the parking exchange application 608, providing information on requesting driver car 108, and the offered fee 604 for securing an available parking space 100 to the central processing database 116, inquiring from the central processing database 116 about available parking spaces 100 in the location vicinity 112, receiving the plurality of available parking spaces address 802, selecting one of the plurality of parking addresses, authorizing the fee payment 902, and upon arriving at the available parking address acknowledging the responding driver car 104.

According to the business method when the requesting driver 106 selects the available parking space 100, the central processing database 116 removes the selected available parking space 100 from the available parking spaces list 804 at the location vicinity 112.

Business method further describes that the central processing database 116 removal of the selected available parking space 100 from the available parking spaces list 804 at the location vicinity 112 is time limited, and the requesting driver 106 authorized fee is transferred to the responding driver 102 and parking exchange application 608, if the requesting driver 106 does not cancel the selection of the available parking space 100 within a predetermined time period 360 and does not arrive at the available parking space 100 within the time limit 362.

Furthermore, the central processing database 116 continuously monitors the location of the responding driver car 104 at the selected available parking space 100, if the responding driver 102 drives the responding driver car 104 away from the selected available parking space 100 for more than 0.2 miles before the time limit 362 period expires and before the requesting driver 106 acknowledges the responding driver car 104 for completion of transaction, the central processing database 116 will remove the selected available parking space 100 from the database, and informs the requesting driver 106 of unavailability of the selected available parking space 100 and cancels requesting driver 106 fee authorization.

As for the fee for releasing the available parking space the business method details an alternative where the central processing database 116 suggests to the responding drivers 102 the fee required for releasing the available parking space 100, based on demand for the available parking space 100 through analysis of local traffic flow, presence of a local event attracting drivers in need of the available parking space 100, local ongoing construction activity limiting available parking spaces 100, local weather conditions, local government advisories affecting traffic flow, or a combination thereof.

Now referring to the Figures, FIG. 1 is an illustration of an available parking space temporarily occupied by a responding driver, a requesting driver on her way to the parking space location vicinity, and the systems associated with the parking exchange application.

FIG. 1 shows a street corner in a down town area where a location vicinity 112 is identified where a requesting driver 106 in a requesting driver car 108 is driving towards an available parking space 100 temporarily occupied by a responding driver 102 in a responding driver car 104.

FIG. 1 further shows smart phones 110 that are used by the requesting driver 106 in requesting an available parking space 100 in a location vicinity 112 and the responding driver 102 in reporting the address of the available parking space 100 temporarily occupied by the responding driver car 104.

FIG. 1 further shows a central processing database 116 that receive the request for an available parking space 100 from the requesting driver 106 and also receives the information on the address of the available parking space 100 temporarily occupied by the responding drive car 104 and coordinates the process of securing an available parking space 100 for the requesting driver 106.

FIG. 1 further shows a cellular phone system antenna tower 114 and an internet 118 connection as illustration of wireless communication between the smart phones 110 or internet 118 based computing platforms used by the requesting driver 106 or responding driver 102 for communication with the central processing database 116.

Figure 2:
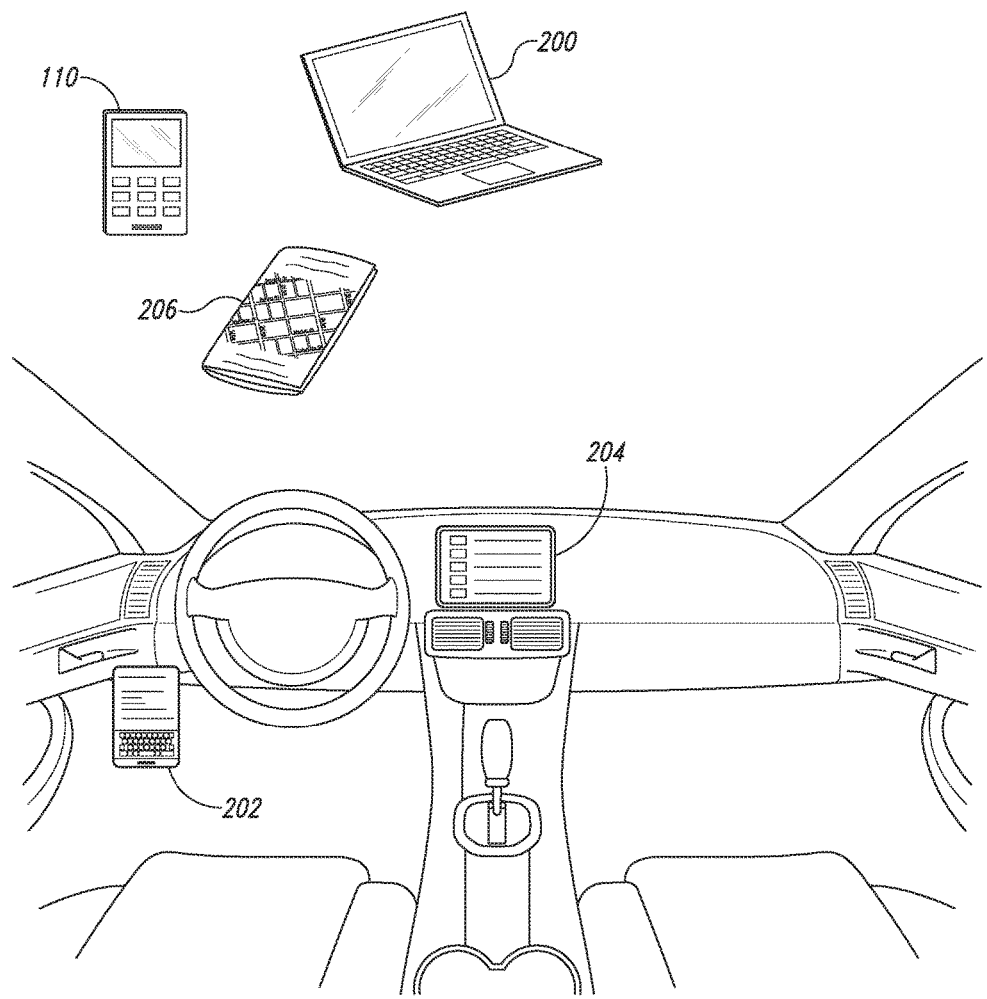
FIG. 2 is an illustration of a smart phone, a tablet, a laptop, a free standing and a fixed in place inside the vehicle computing platform with the parking exchange application software installed.

FIG. 2 illustrate a plurality of communication devices used for communication between the central processing database 116 (not shown here) and the requesting driver 106 (not shown here) and responding driver 102 (not shown here).

The communication devices include a smart phone 110, a laptop 200, a tablet 206, a portable computing platform 202, and a fixed to an automobile computing platform 204 inside an automobile. All of the communication devices illustrated in FIG. 2 have the parking exchange application 608 software installed on them.

Figure 3A:
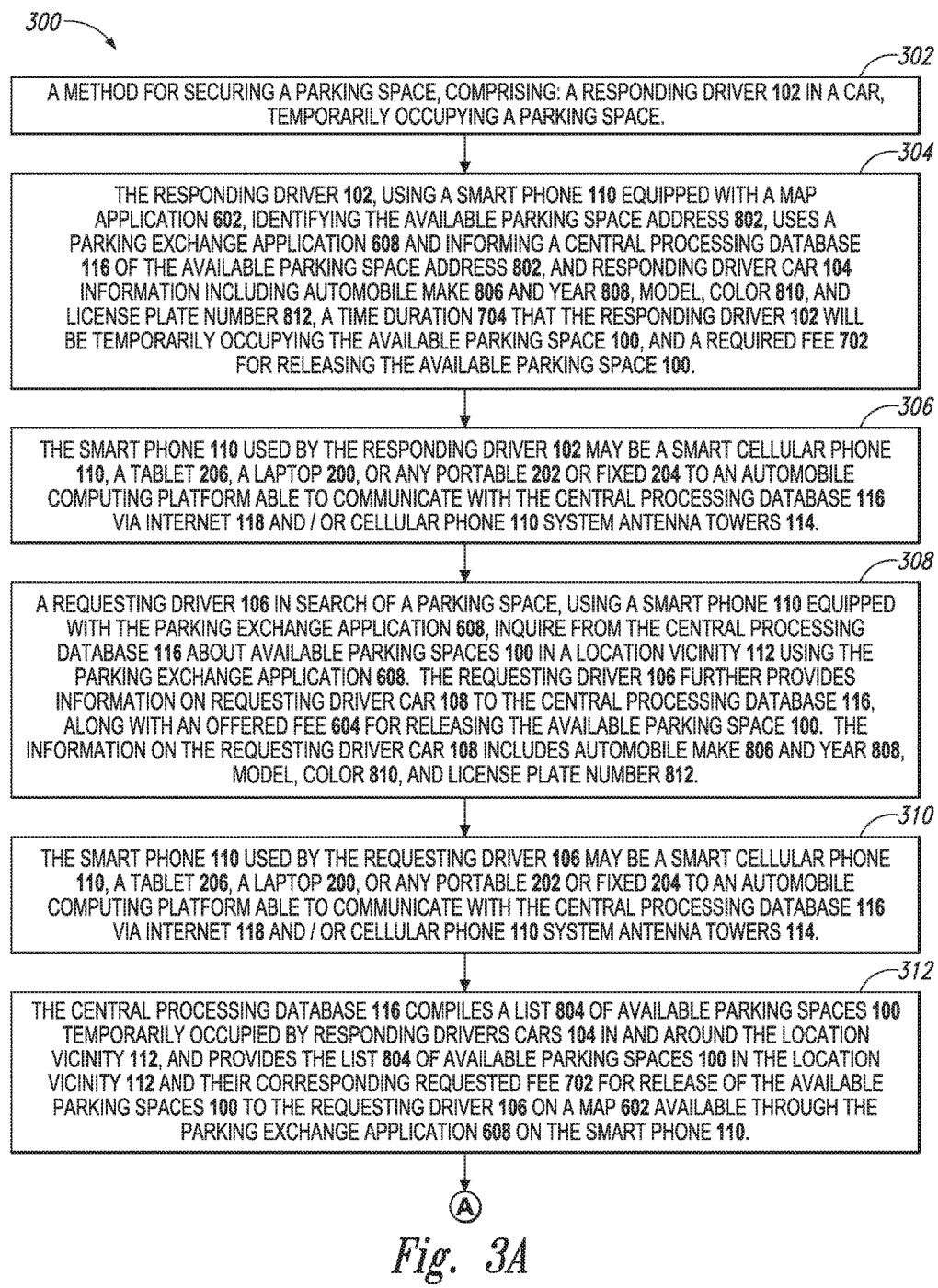
FIG. 3 consisting of FIGS. 3A, 3B, and 3C is a flow chart detailing a method for securing a parking space.
Figure 3B:
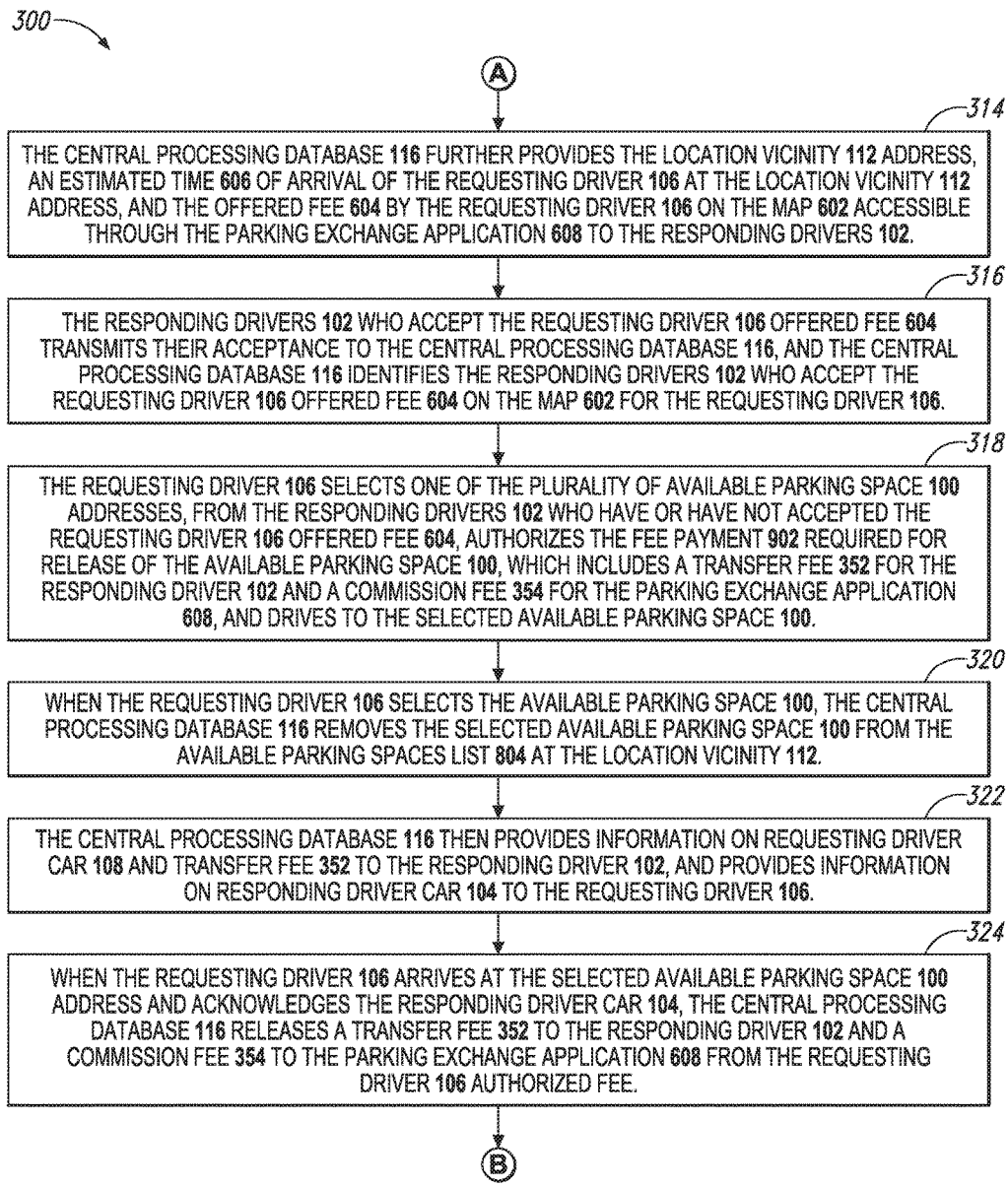
Figure 3C:
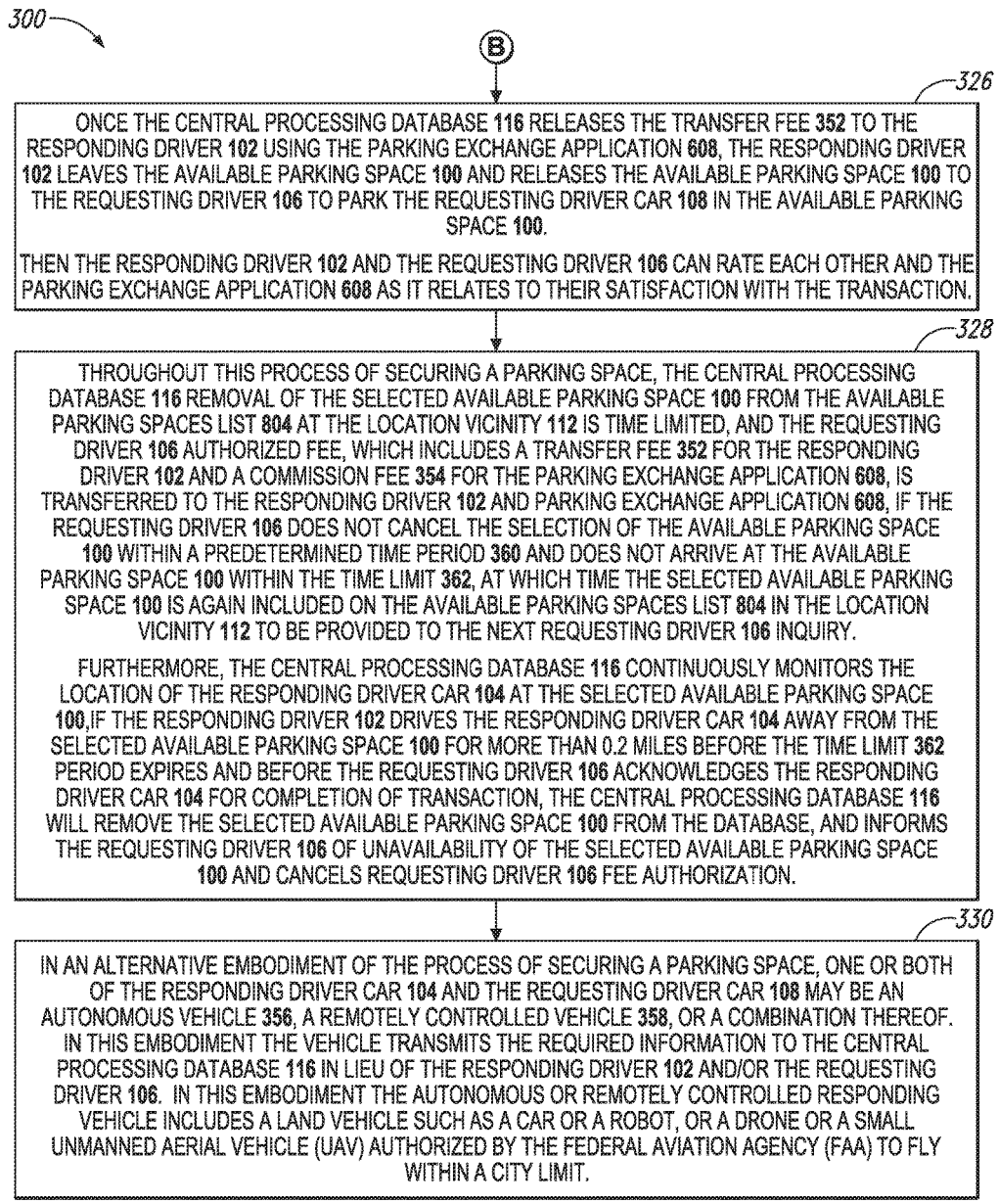

FIG. 3 consisting of FIGS. 3A, 3B, and 3C is a flow chart detailing steps involved in a method for securing a parking space 300. Following details further elaborates on the steps outlined in FIG. 3.

Step 302 details a method for securing a parking space, comprising: a responding driver 102 in a car, temporarily occupying a parking space.

Step 304 indicates the responding driver 102, using a smart phone 110 equipped with a map application 602, identifying the available parking space address 802, uses a parking exchange application 608 and informing a central processing database 116 of the available parking space address 802, and responding driver car 104 information including automobile make 806 and year 808, model, color 810, and license plate number 812, a time duration 704 that the responding driver 102 will be temporarily occupying the available parking space 100, and a required fee 702 for releasing the available parking space 100.

Step 306 indicates the smart phone 110 used by the responding driver 102 may be a smart cellular phone 110, a tablet 206, a laptop 200, or any portable 202 or fixed 204 to an automobile computing platform able to communicate with the central processing database 116 via internet 118 and/or cellular phone 110 system antenna towers 114.

Step 308 indicates a requesting driver 106 in search of a parking space, using a smart phone 110 equipped with the parking exchange application 608, inquire from the central processing database 116 about available parking spaces 100 in a location vicinity 112 using the parking exchange application 608. The requesting driver 106 further provides information on requesting driver car 108 to the central processing database 116, along with an offered fee 604 for releasing the available parking space 100. The information on the requesting driver car 108 includes automobile make 806 and year 808, model, color 810, and license plate number 812.

Step 310 indicates the smart phone 110 used by the requesting driver 106 may be a smart cellular phone 110, a tablet 206, a laptop 200, or any portable 202 or fixed 204 to an automobile computing platform able to communicate with the central processing database 116 via internet 118 and/or cellular phone 110 system antenna towers 114.

Step 312 indicates the central processing database 116 compiles a list 804 of available parking spaces 100 temporarily occupied by responding drivers cars 104 in and around the location vicinity 112, and provides the list 804 of available parking spaces 100 in the location vicinity 112 and their corresponding requested fee 702 for release of the available parking spaces 100 to the requesting driver 106 on a map 602 available through the parking exchange application 608 on the smart phone 110.

Step 314 indicates the central processing database 116 further provides the location vicinity 112 address, an estimated time 606 of arrival of the requesting driver 106 at the location vicinity 112 address, and the offered fee 604 by the requesting driver 106 on the map 602 accessible through the parking exchange application 608 to the responding drivers 102.

Step 316 indicates the responding drivers 102 who accept the requesting driver 106 offered fee 604 transmits their acceptance to the central processing database 116, and the central processing database 116 identifies the responding drivers 102 who accept the requesting driver 106 offered fee 604 on the map 602 for the requesting driver 106.

Step 318 indicates the requesting driver 106 selects one of the plurality of available parking space 100 addresses, from the responding drivers 102 who have or have not accepted the requesting driver 106 offered fee 604, authorizes the fee payment 902 required for release of the available parking space 100, which includes a transfer fee 352 for the responding driver 102 and a commission fee 354 for the parking exchange application 608, and drives to the selected available parking space 100.

Step 320 indicates when the requesting driver 106 selects the available parking space 100, the central processing database 116 removes the selected available parking space 100 from the available parking spaces list 804 at the location vicinity 112.

Step 322 indicates the central processing database 116 then provides information on requesting driver car 108 and transfer fee 352 to the responding driver 102, and provides information on responding driver car 104 to the requesting driver 106.

Step 324 indicates when the requesting driver 106 arrives at the selected available parking space 100 address and acknowledges the responding driver car 104, the central processing database 116 releases a transfer fee 352 to the responding driver 102 and a commission fee 354 to the parking exchange application 608 from the requesting driver 106 authorized fee.

Step 326 indicates once the central processing database 116 releases the transfer fee 352 to the responding driver 102 using the parking exchange application 608, the responding driver 102 leaves the available parking space 100 and releases the available parking space 100 to the requesting driver 106 to park the requesting driver car 108 in the available parking space 100. Then the responding driver 102 and the requesting driver 106 can rate each other and the parking exchange application 608 as it relates to their satisfaction with the transaction.

Step 328 indicates throughout this process of securing a parking space, the central processing database 116 removal of the selected available parking space 100 from the available parking spaces list 804 at the location vicinity 112 is time limited, and the requesting driver 106 authorized fee, which includes a transfer fee 352 for the responding driver 102 and a commission fee 354 for the parking exchange application 608, is transferred to the responding driver 102 and parking exchange application 608, if the requesting driver 106 does not cancel the selection of the available parking space 100 within a predetermined time period 360 and does not arrive at the available parking space 100 within the time limit 362, at which time the selected available parking space 100 is again included on the available parking spaces list 804 in the location vicinity 112 to be provided to the next requesting driver 106 inquiry. Furthermore, the central processing database 116 continuously monitors the location of the responding driver car 104 at the selected available parking space 100, if the responding driver 102 drives the responding driver car 104 away from the selected available parking space 100 for more than 0.2 miles before the time limit 362 period expires and before the requesting driver 106 acknowledges the responding driver car 104 for completion of transaction, the central processing database 116 will remove the selected available parking space 100 from the database, and informs the requesting driver 106 of unavailability of the selected available parking space 100 and cancels requesting driver 106 fee authorization.

Step 330 indicates in an alternative embodiment of the process of securing a parking space, one or both of the responding driver car 104 and the requesting driver car 108 may be an autonomous vehicle 356, a remotely controlled vehicle 358, or a combination thereof. In this embodiment the vehicle transmits the required information to the central processing database 116 in lieu of the responding driver 102 and/or the requesting driver 106. In this embodiment the autonomous or remotely controlled responding vehicle includes a land vehicle such as a car or a robot, or a drone or a small unmanned aerial vehicle (UAV) authorized by the federal aviation agency (FAA) to fly within a city limit.

Figure 4A:
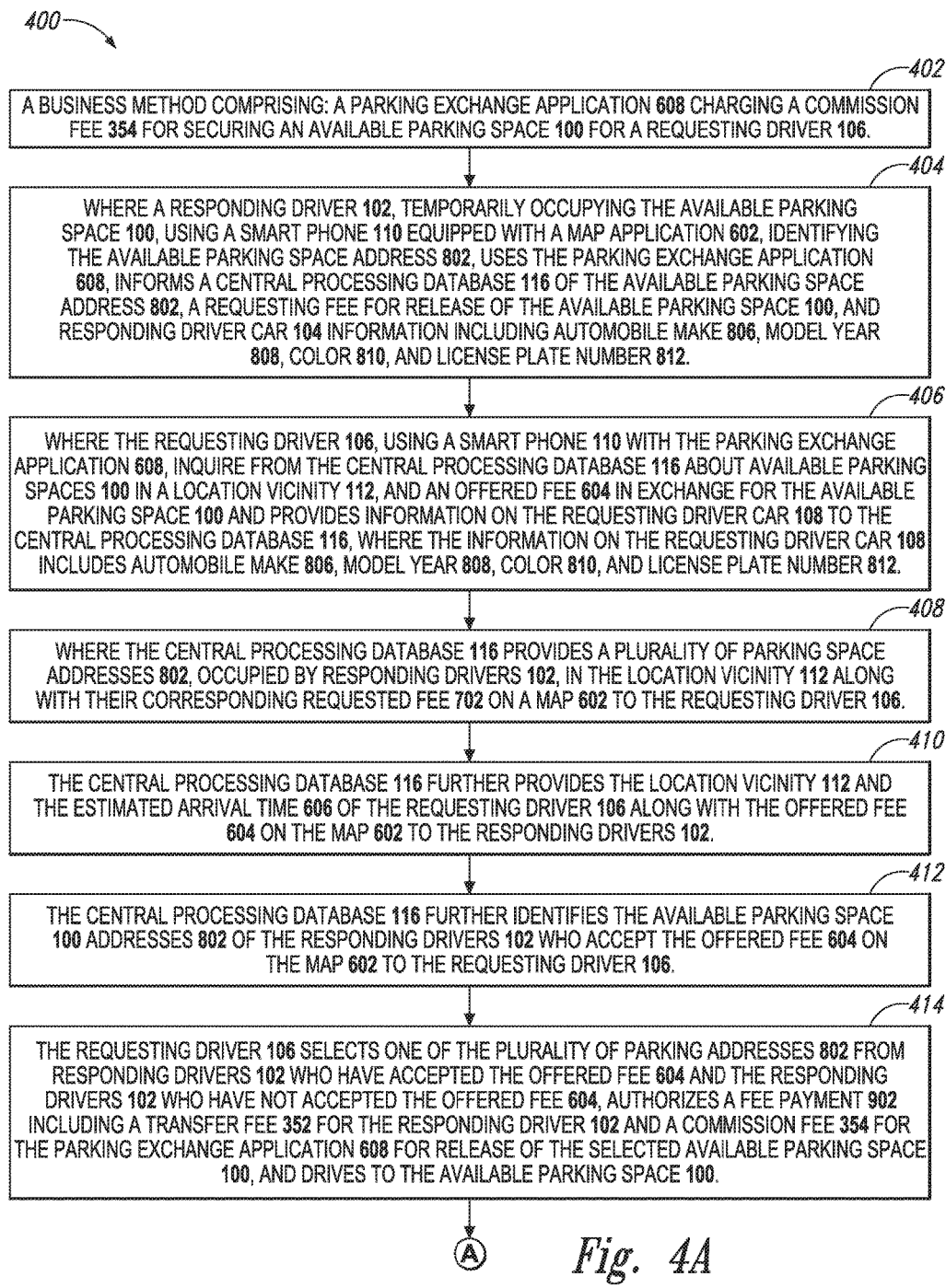
FIG. 4 consisting of FIGS. 4A, 4B, and 4C is a flow chart detailing a business method comprising a parking exchange application charging a commission fee for securing an available parking space for a requesting driver.
Figure 4B:
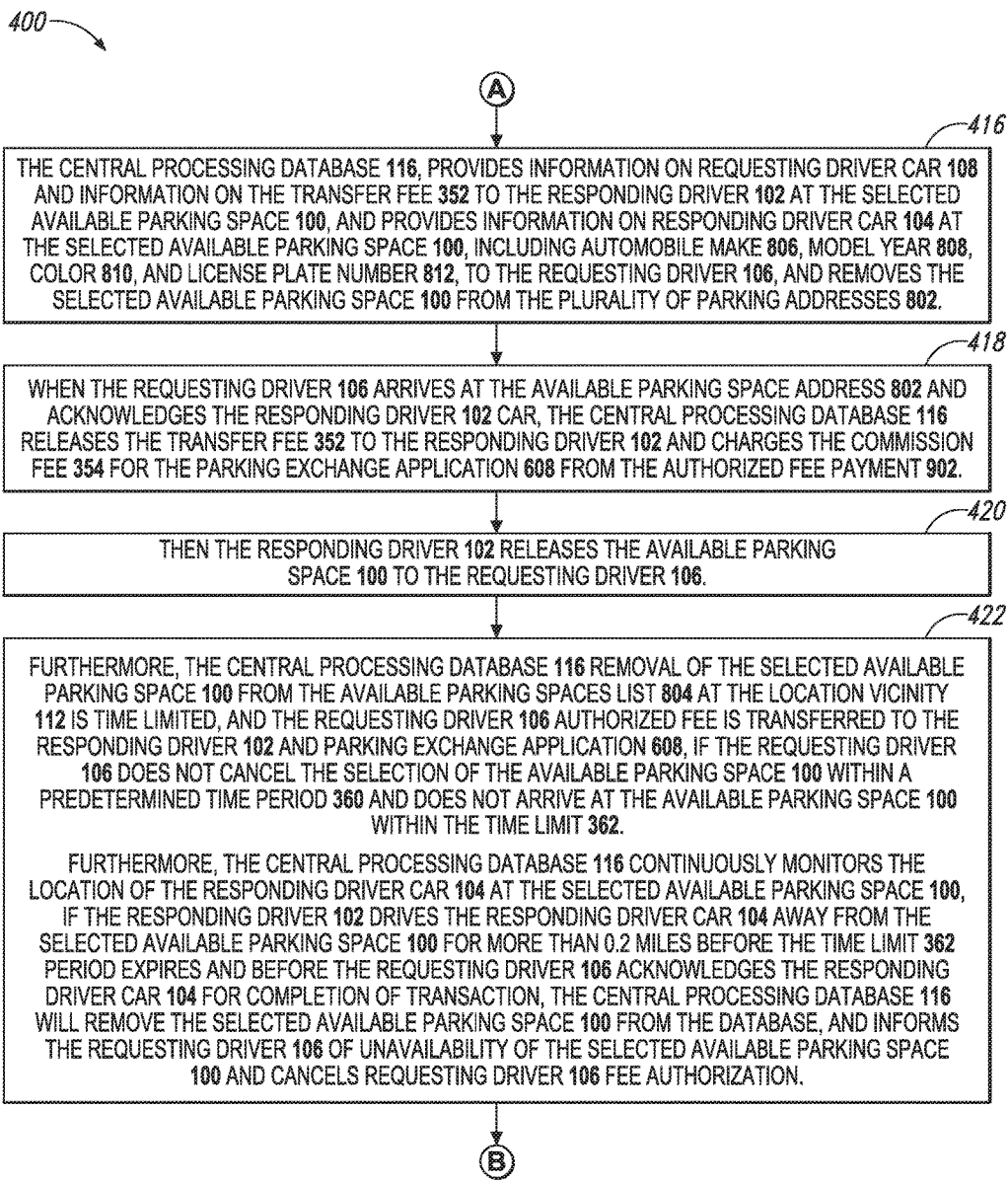
Figure 4C:
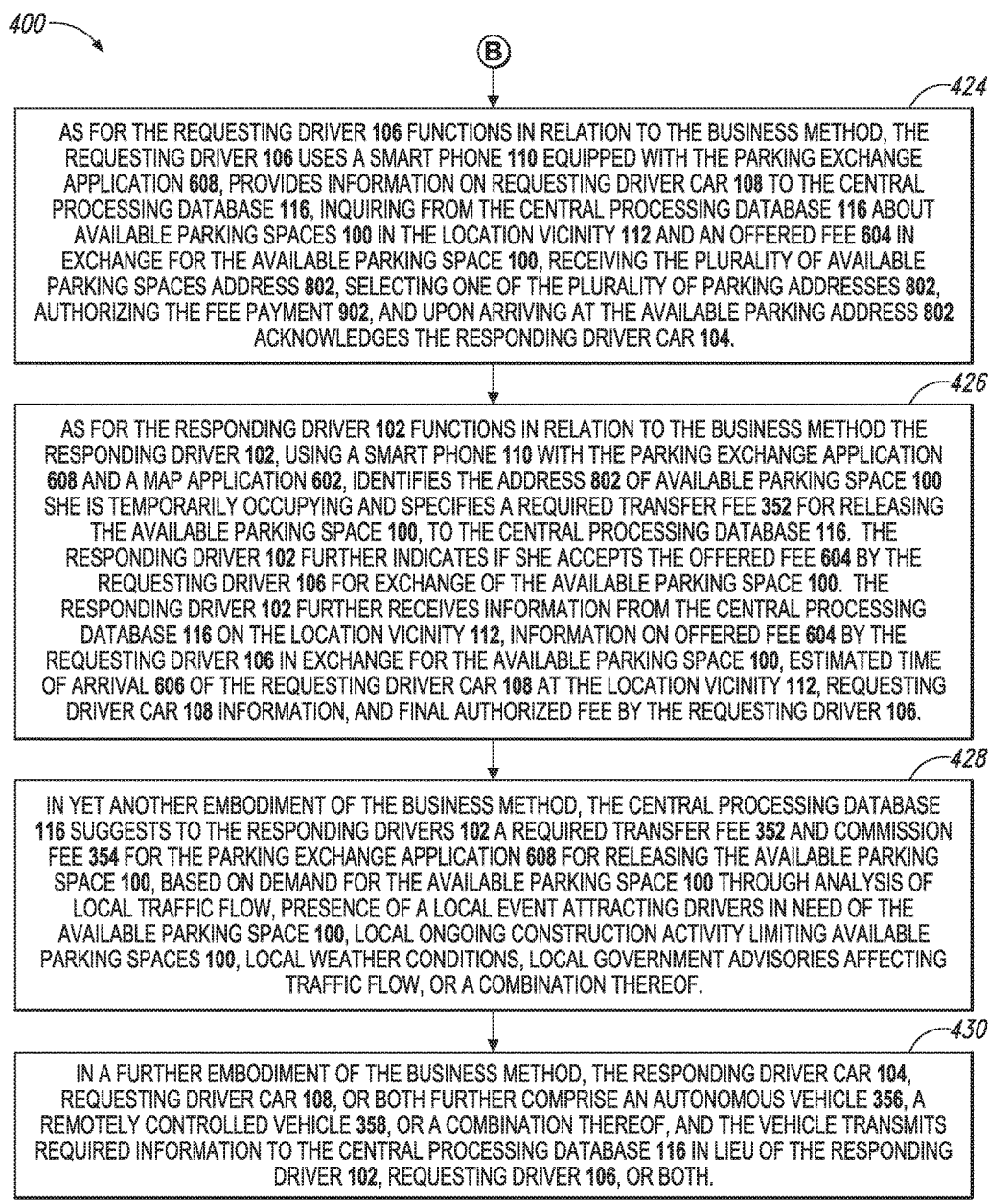

FIG. 4 consisting of FIGS. 4A, 4B, and 4C is a flow chart detailing a business method comprising a parking exchange application charging a commission fee for securing an available parking space for a requesting driver 400. Following details further elaborates on the steps outlined in FIG. 4.

Step 402 details a business method comprising: a parking exchange application 608 charging a commission fee 354 for securing an available parking space 100 for a requesting driver 106.

Step 404 indicates where a responding driver 102, temporarily occupying the available parking space 100, using a smart phone 110 equipped with a map application 602, identifying the available parking space address 802, uses the parking exchange application 608, informs a central processing database 116 of the available parking space address 802, a requesting fee for release of the available parking space 100, and responding driver car 104 information including automobile make 806, model year 808, color 810, and license plate number 812.

Step 406 indicates where the requesting driver 106, using a smart phone 110 with the parking exchange application 608, inquire from the central processing database 116 about available parking spaces 100 in a location vicinity 112, and an offered fee 604 in exchange for the available parking space 100 and provides information on the requesting driver car 108 to the central processing database 116, where the information on the requesting driver car 108 includes automobile make 806, model year 808, color 810, and license plate number 812.

Step 408 indicates where the central processing database 116 provides a plurality of parking space addresses 802, occupied by responding drivers 102, in the location vicinity 112 along with their corresponding requested fee 702 on a map 602 to the requesting driver 106.

Step 410 indicates the central processing database 116 further provides the location vicinity 112 and the estimated arrival time 606 of the requesting driver 106 along with the offered fee 604 on the map 602 to the responding drivers 102.

Step 412 indicates the central processing database 116 further identifies the available parking space 100 addresses 802 of the responding drivers 102 who accept the offered fee 604 on the map 602 to the requesting driver 106.

Step 414 indicates the requesting driver 106 selects one of the plurality of parking addresses 802 from responding drivers 102 who have accepted the offered fee 604 and the responding drivers 102 who have not accepted the offered fee 604, authorizes a fee payment 902 including a transfer fee 352 for the responding driver 102 and a commission fee 354 for the parking exchange application 608 for release of the selected available parking space 100, and drives to the available parking space 100.

Step 416 indicates the central processing database 116, provides information on requesting driver car 108 and information on the transfer fee 352 to the responding driver 102 at the selected available parking space 100, and provides information on responding driver car 104 at the selected available parking space 100, including automobile make 806, model year 808, color 810, and license plate number 812, to the requesting driver 106, and removes the selected available parking space 100 from the plurality of parking addresses 802.

Step 418 indicates when the requesting driver 106 arrives at the available parking space address 802 and acknowledges the responding driver 102 car, the central processing database 116 releases the transfer fee 352 to the responding driver 102 and charges the commission fee 354 for the parking exchange application 608 from the authorized fee payment 902.

Step 420 indicates that then the responding driver 102 releases the available parking space 100 to the requesting driver 106.

Step 422 indicates furthermore, the central processing database 116 removal of the selected available parking space 100 from the available parking spaces list 804 at the location vicinity 112 is time limited, and the requesting driver 106 authorized fee is transferred to the responding driver 102 and parking exchange application 608, if the requesting driver 106 does not cancel the selection of the available parking space 100 within a predetermined time period 360 and does not arrive at the available parking space 100 within the time limit 362. Furthermore, the central processing database 116 continuously monitors the location of the responding driver car 104 at the selected available parking space 100. If the responding driver 102 drives the responding driver car 104 away from the selected available parking space 100 for more than 0.2 miles before the time limit 362 period expires and before the requesting driver 106 acknowledges the responding driver car 104 for completion of transaction, the central processing database 116 will remove the selected available parking space 100 from the database, and informs the requesting driver 106 of unavailability of the selected available parking space 100 and cancels requesting driver 106 fee authorization.

Step 424 indicates as for the requesting driver 106 functions in relation to the business method, the requesting driver 106 uses a smart phone 110 equipped with the parking exchange application 608, provides information on requesting driver car 108 to the central processing database 116, inquiring from the central processing database 116 about available parking spaces 100 in the location vicinity 112 and an offered fee 604 in exchange for the available parking space 100, receiving the plurality of available parking spaces address 802, selecting one of the plurality of parking addresses 802, authorizing the fee payment 902, and upon arriving at the available parking address 802 acknowledges the responding driver car 104.

Step 426 indicates as for the responding driver 102 functions in relation to the business method the responding driver 102, using a smart phone 110 with the parking exchange application 608 and a map application 602, identifies the address 802 of available parking space 100 she is temporarily occupying and specifies a required transfer fee 352 for releasing the available parking space 100, to the central processing database 116. The responding driver 102 further indicates if she accepts the offered fee 604 by the requesting driver 106 for exchange of the available parking space 100. The responding driver 102 further receives information from the central processing database 116 on the location vicinity 112, information on offered fee 604 by the requesting driver 106 in exchange for the available parking space 100, estimated time of arrival 606 of the requesting driver car 108 at the location vicinity 112, requesting driver car 108 information, and final authorized fee by the requesting driver 106.

Step 428 indicates in yet another embodiment of the business method, the central processing database 116 suggests to the responding drivers 102 a required transfer fee 352 and commission fee 354 for the parking exchange application 608 for releasing the available parking space 100, based on demand for the available parking space 100 through analysis of local traffic flow, presence of a local event attracting drivers in need of the available parking space 100, local ongoing construction activity limiting available parking spaces 100, local weather conditions, local government advisories affecting traffic flow, or a combination thereof.

Step 430 indicates in a further embodiment of the business method, the responding driver car 104, requesting driver car 108, or both further comprise an autonomous vehicle 356, a remotely controlled vehicle 358, or a combination thereof, and the vehicle transmits required information to the central processing database 116 in lieu of the responding driver 102, requesting driver 106, or both.

Figure 5A:
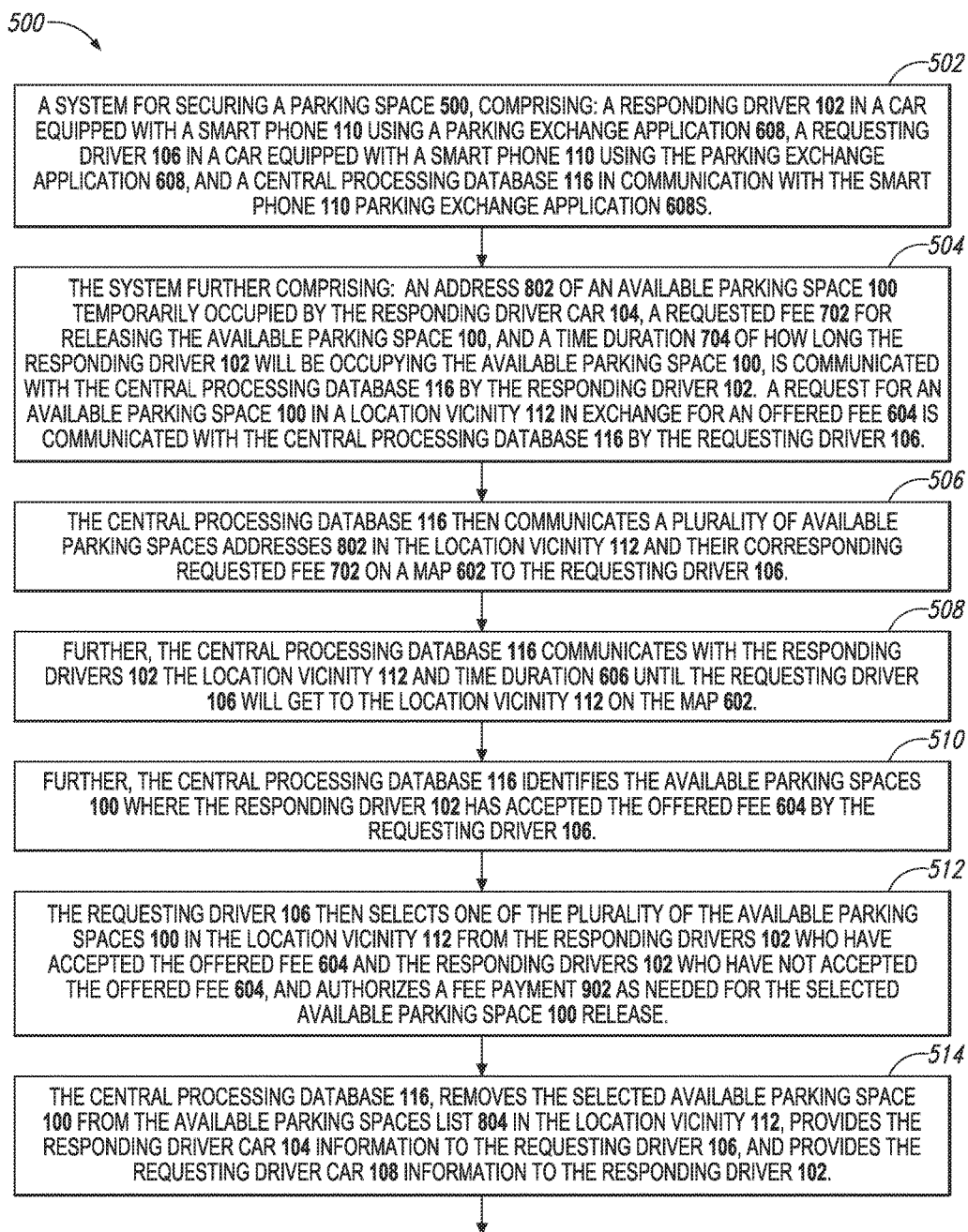
FIG. 5 consisting of FIGS. 5A and 5B is a flow chart detailing a system for securing a parking space.
Figure 5B:
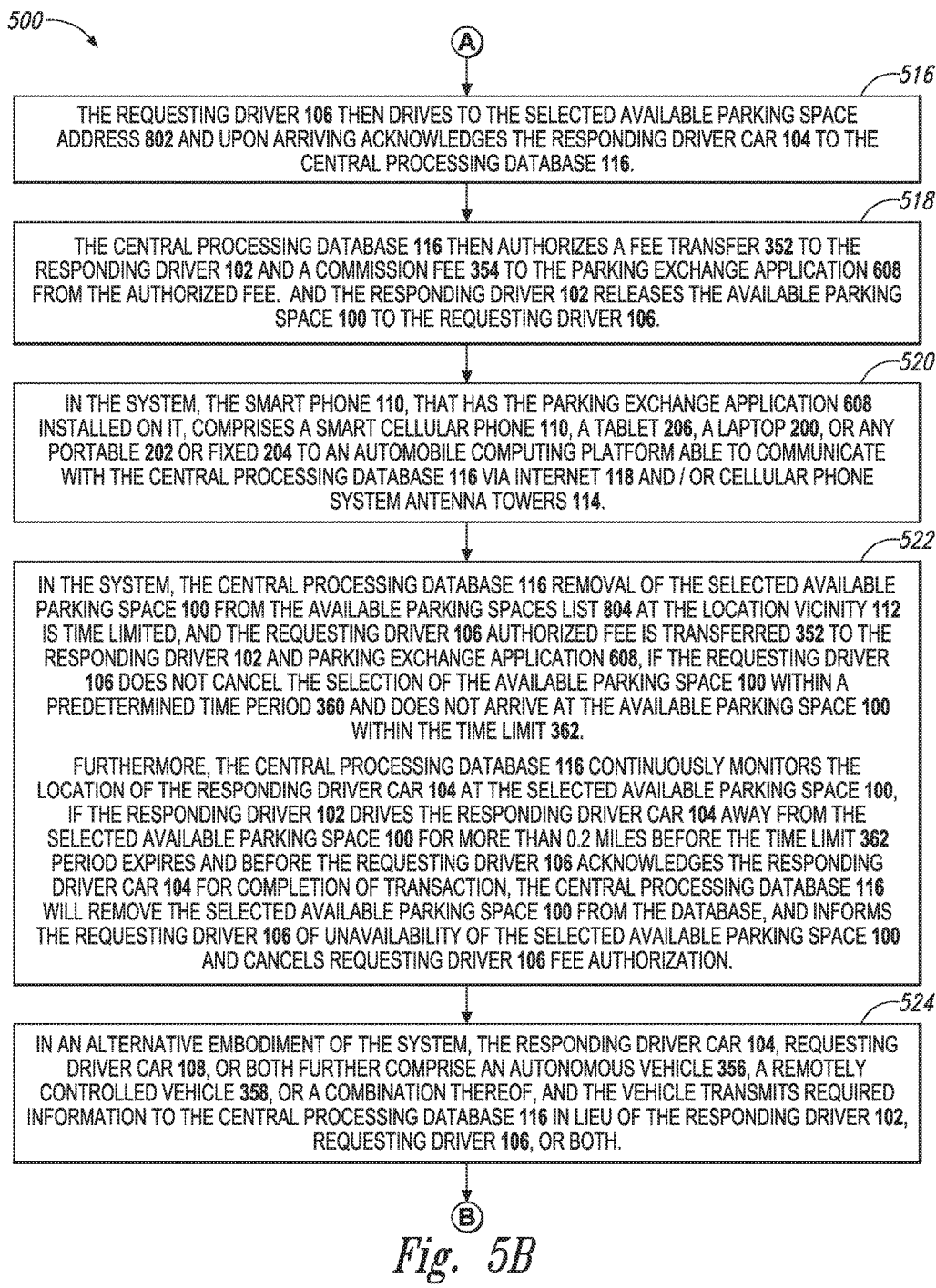

FIG. 5 consisting of FIGS. 5A and 5B is a flow chart detailing a system for securing a parking space 500. Following details further elaborates on the steps outlined in FIG. 5.

Step 502 details a system for securing a parking space 500, comprising: a responding driver 102 in a car equipped with a smart phone 110 using a parking exchange application 608, a requesting driver 106 in a car equipped with a smart phone 110 using the parking exchange application 608, and a central processing database 116 in communication with the smart phone 110 parking exchange application 608s.

Step 504 indicates the system further comprising: an address 802 of an available parking space 100 temporarily occupied by the responding driver car 104, a requested fee 702 for releasing the available parking space 100, and a time duration 704 of how long the responding driver 102 will be occupying the available parking space 100, is communicated with the central processing database 116 by the responding driver 102. A request for an available parking space 100 in a location vicinity 112 in exchange for an offered fee 604 is communicated with the central processing database 116 by the requesting driver 106.

Step 506 indicates the central processing database 116 then communicates a plurality of available parking spaces addresses 802 in the location vicinity 112 and their corresponding requested fee 702 on a map 602 to the requesting driver 106.

Step 508 indicates further, the central processing database 116 communicates with the responding drivers 102 the location vicinity 112 and time duration 606 until the requesting driver 106 will get to the location vicinity 112 on the map 602.

Step 510 indicates further, the central processing database 116 identifies the available parking spaces 100 where the responding driver 102 has accepted the offered fee 604 by the requesting driver 106.

Step 512 indicates further that the requesting driver 106 then selects one of the plurality of the available parking spaces 100 in the location vicinity 112 from the responding drivers 102 who have accepted the offered fee 604 and the responding drivers 102 who have not accepted the offered fee 604, and authorizes a fee payment 902 as needed for the selected available parking space 100 release.

Step 514 indicates that the central processing database 116, removes the selected available parking space 100 from the available parking spaces list 804 in the location vicinity 112, provides the responding driver car 104 information to the requesting driver 106, and provides the requesting driver car 108 information to the responding driver 102.

Step 516 indicates that the requesting driver 106 then drives to the selected available parking space address 802 and upon arriving acknowledges the responding driver car 104 to the central processing database 116.

Step 518 indicates that the central processing database 116 then authorizes a fee transfer 352 to the responding driver 102 and a commission fee 354 to the parking exchange application 608 from the authorized fee. And the responding driver 102 releases the available parking space 100 to the requesting driver 106.

Step 520 indicates that in the system, the smart phone 110, that has the parking exchange application 608 installed on it, comprises a smart cellular phone 110, a tablet 206, a laptop 200, or any portable 202 or fixed 204 to an automobile computing platform able to communicate with the central processing database 116 via internet 118 and/or cellular phone system antenna towers 114.

Step 522 indicates that in the system, the central processing database 116 removal of the selected available parking space 100 from the available parking spaces list 804 at the location vicinity 112 is time limited, and the requesting driver 106 authorized fee is transferred 352 to the responding driver 102 and parking exchange application 608, if the requesting driver 106 does not cancel the selection of the available parking space 100 within a predetermined time period 360 and does not arrive at the available parking space 100 within the time limit 362. Furthermore, the central processing database 116 continuously monitors the location of the responding driver car 104 at the selected available parking space 100, if the responding driver 102 drives the responding driver car 104 away from the selected available parking space 100 for more than 0.2 miles before the time limit 362 period expires and before the requesting driver 106 acknowledges the responding driver car 104 for completion of transaction, the central processing database 116 will remove the selected available parking space 100 from the database, and informs the requesting driver 106 of unavailability of the selected available parking space 100 and cancels requesting driver 106 fee authorization.

Step 524 indicates that in an alternative embodiment of the system, the responding driver car 104, requesting driver car 108, or both further comprise an autonomous vehicle 356, a remotely controlled vehicle 358, or a combination thereof, and the vehicle transmits required information to the central processing database 116 in lieu of the responding driver 102, requesting driver 106, or both.

Figures 6, 7:
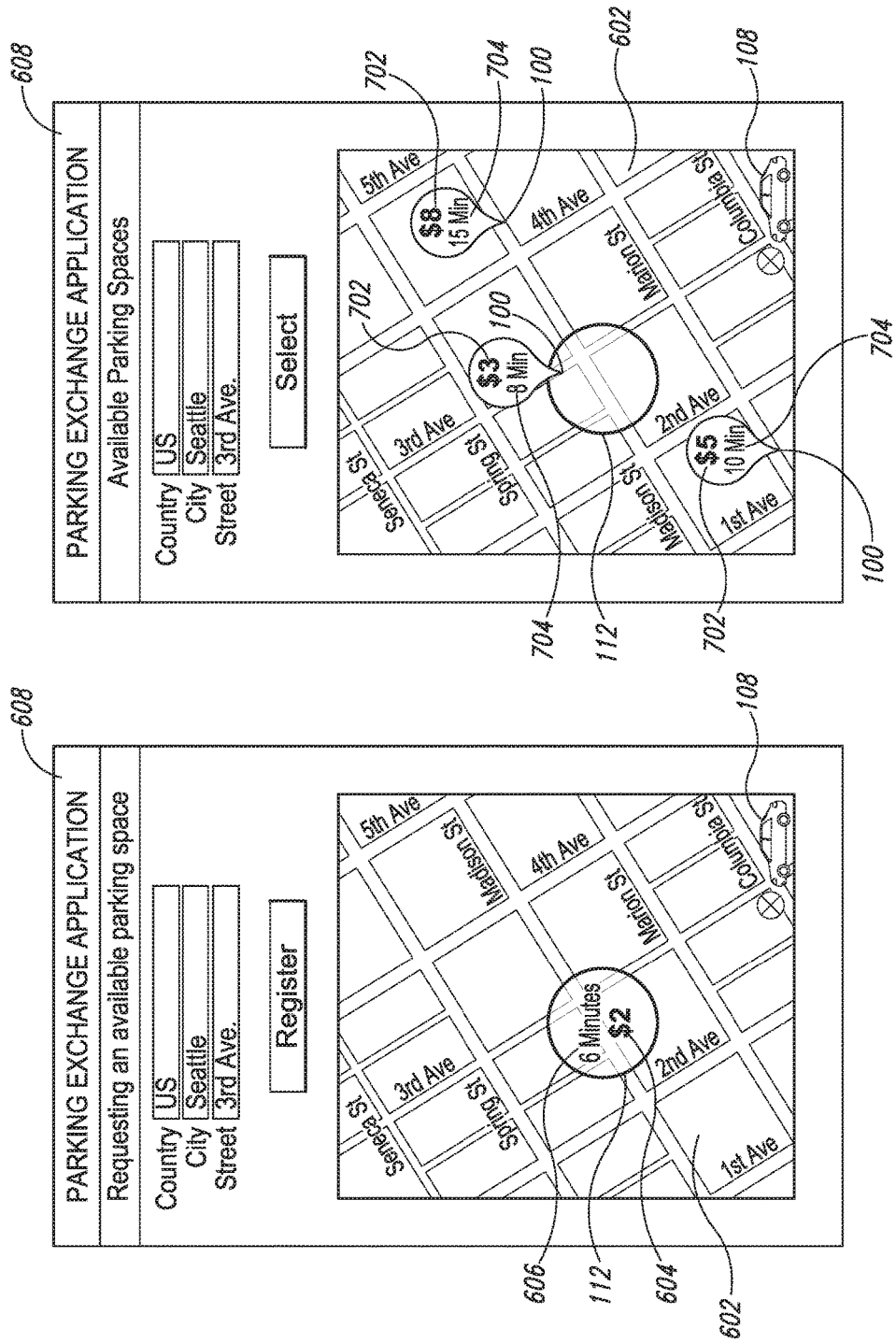
FIG. 6 is an illustration of the parking exchange application map page on requesting an available parking space.
FIG. 7 is an illustration of the parking exchange application map page on available parking spaces.

FIG. 6 is an illustration of the parking exchange application map page on requesting an available parking space.

The parking exchange application 608 page on requesting an available parking space 100 includes icons for entering country, city and street address of a location and location vicinity 112 where the requesting drive 106 is seeking an available parking space 100.

The parking exchange application 608 page on requesting an available parking space 100 further includes a register icon, where the requesting driver 106 can indicate his request for an available parking space 100 at the location vicinity 112 address.

Furthermore the map 602 on the page shows the location vicinity 112 the requesting driver offered fee 604 in exchange for the available parking space 100, and an estimated time of arrival 606 of the requesting driver 106 at the location vicinity 112 address. The map 602 further shows the present location of the requesting driver car 108.

FIG. 7 is an illustration of the parking exchange application map page on available parking spaces.

The parking exchange application 608 page on available parking spaces 100 includes the icons where the location vicinity 112 address is outlined and a select icon where the requesting driver 106 can indicate that he want to see a list of available parking spaces 804 on a follow-on page.

The map 602 of the parking exchange application 608 page on available parking spaces 100 includes a reference to the location vicinity 112 and shows a plurality of available parking spaces 100 and associated responding driver 102 requested fee 702 for releasing the temporarily occupied available parking space 100. The map 602 further show a responding driver time duration 704 of occupying the available parking space 100.

The map 602 of the parking exchange application 608 page on available parking spaces 100 further shows the present location of the requesting driver car 108.

FIG. 8 is an illustration of the parking exchange application page on list of available parking spaces.

The parking exchange application 608 page on list of available parking spaces 804 includes a list 804 of a plurality of available parking spaces, where on each listing the included information comprise the responding driver car 104 automobile make 806, the automobile model year 808, the automobile color 810, the automobile license plate number 812, the temporarily occupied available parking space address 802, and the responding driver requested fee 702 for releasing the available parking space.

FIG. 9 is an illustration of parking exchange application page on selecting an available parking space and authorizing required fee.

The parking exchange application 608 page on selecting an available parking space 100 and authorizing the required fee 902 for release of the available parking space 100 includes an icon for the requesting driver 106 identifying which listing and the corresponding responding driver 102 is selected.

The page further includes an icon listing the selected available parking space address 802, and an icon indicating the required fee 902 for release of the selected available parking space 100.

The page further includes the requesting driver 106 credit card information comprising icons for entering the credit card number, the security code CVV and an expiration date of the credit card. The page further includes a Select icon for the requesting driver 106 to finalize his selection and authorize payment of the fee payment 902.

Figure 10:
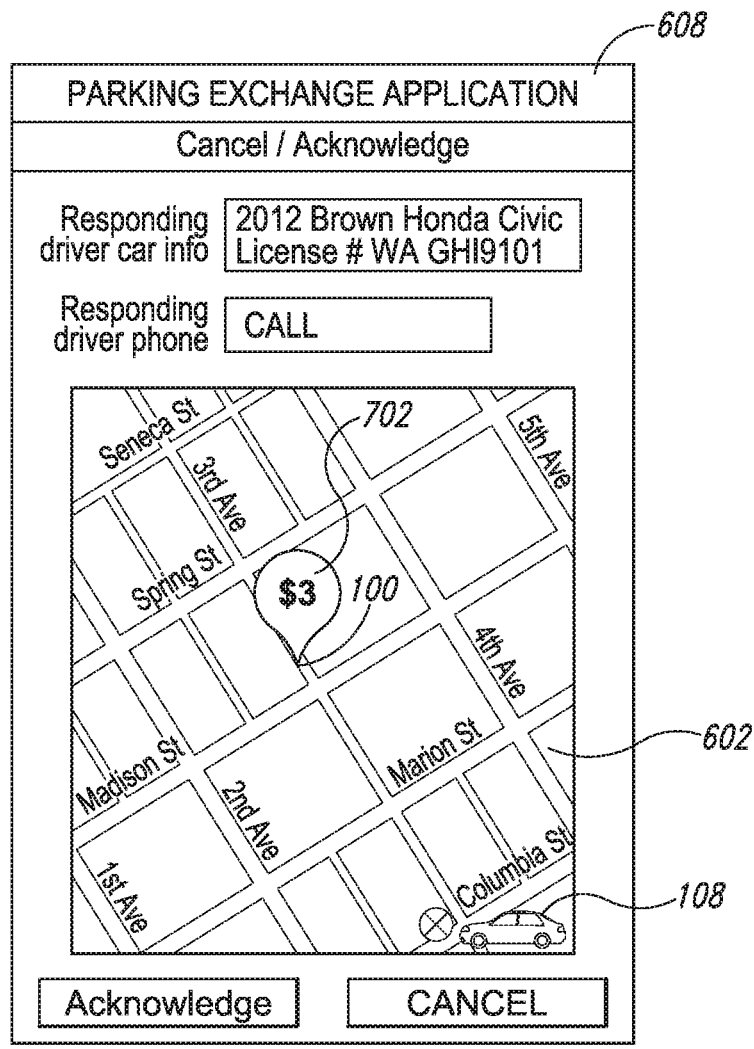
FIG. 10 is an illustration of parking exchange application cancel/acknowledge page.

FIG. 10 is an illustration of parking exchange application cancel/acknowledge page.

The parking exchange application 608 cancel/acknowledge page includes an icon listing the selected available parking space 100 occupying responding driver car 104 information. The page further includes an icon titled CALL, through which the requesting driver 106 can call the responding driver 102 phone.

The cancel/acknowledge page further includes a map 602, where the selected available parking space 100 is identified on it along with the required fee payment 902 for releasing the selected available parking space 100 and the location of the requesting driver car 108.

The cancel/acknowledge page further includes two icons. One icon identified as Acknowledge for acknowledging the responding driver car 104, when the requesting driver 106 arrives at the selected available parking space 100, upon which the central processing database 116 will release a transfer fee 352 to the responding driver 102 to release the selected available parking space 100 to the requesting driver 106 and a commission fee 354 to the parking exchange application 608.

The second icon is identified as Cancel, where the requesting driver 106 can cancel her search and selection of the available parking space 100 to avoid payment of the required fee payment 902 if she does not intend to occupy the selected parking space 100. The cancelling of the selection of the available parking space 100 must happen within a predetermined time period 360 before a time limit 362 expires, upon which the requesting driver 106 should have arrived at the selected available parking space 100. If the requesting driver 106 does not cancel the selection and does not arrive at the selected available parking space 100 within the time limit 362, then the central processing database 116 authorizes payment of transfer fee 352 to the responding driver 102 and the commission fee 354 to the parking exchange application 608 from the authorized required fee payment 902, and re-enters the selected available parking space 100 in the list of available parking spaces for other requesting drivers' inquiry.

In yet another embodiment of the present disclosure a private owner of a parking space can offer availability of her available parking space 100 on the parking exchange application 608 as a responder and also can accept the requester's 106 offer for exchange.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purpose of limitation.

We claim:

1. A method for securing a parking space, comprising:
   a responding driver in a car, temporarily occupying a parking space, and
   in exchange for a fee, releasing the parking space to a requesting driver in a car,
   where the fee comprises an offered fee by the requesting driver and accepted by the responding driver, or a requested fee by responding driver and accepted by the requesting driver,
   where the responding driver informs a central processing database of the temporarily occupied parking space address, the responding driver requested fee, and a time duration that the responding driver will be temporarily occupying the available parking space, using a parking exchange application,
   the requesting driver inquire from the central processing database about available parking spaces in a location vicinity and provides the requesting driver offered fee, using the parking exchange application,
   the central processing database provides a plurality of parking space addresses on a map accessible through the parking exchange application, occupied by responding drivers and their corresponding requested fees, in the location vicinity to the requesting driver,
   the central processing database further provides the location vicinity address, an estimated time of arrival of the requesting driver at the location vicinity address, and the offered fee by the requesting driver on the map accessible through the parking exchange application to the responding drivers,
   the responding drivers who accept the requesting driver offered fee transmits their acceptance to the central processing database,
   the central processing database identifies the responding drivers who accept the requesting driver offered fee on the map for the requesting driver,
   the requesting driver will select one of the responding drivers' available parking space addresses from the responding drivers who have or have not accepted the requesting driver offered fee,
   the requesting driver authorizes the fee payment and drives to the selected available parking space,
   the central processing database, provides information on requesting driver car to the selected responding driver, and provides information on responding driver car at the selected available parking space address to the requesting driver,
   when the requesting driver arrives at the selected available parking space address and acknowledges the responding driver car, the central processing database releases a transfer fee to the responding driver and a commission fee to the parking exchange application, from the authorized fee, and
   the responding driver releases the available parking space to the requesting driver.

2. The method of claim 1, where
   the responding driver and the requesting driver can rate each other and the parking exchange application as it relates to their satisfaction with the transaction.

3. The method of claim 2, where the responding driver using a smart phone equipped with a map application, identifies the parking space address, uses the parking exchange application informing the central processing database of the parking space address, and responding driver car information, and receives information from the central processing database on requesting driver car information and information on the transfer fee.

4. The method of claim 2, where the requesting driver using a smart phone equipped with the parking exchange application, provides information on requesting driver car to the central processing database, inquiring from the central processing database about available parking spaces in the location vicinity, receiving the plurality of available parking spaces address, selecting one of the plurality of parking addresses, authorizing the fee payment, and
   upon arriving at the available parking address acknowledging the responding driver car.

5. The method of claim 2, where the information on responding driver car and requesting driver car comprise automobile make, model, color, and license plate number.

6. The method of claim 2, where when the requesting driver selects the available parking space, the central processing database removes the selected available parking space from the available parking spaces list at the location vicinity.

7. The method of claim 2, where the responding driver car, requesting driver car, or both further comprise an autonomous vehicle, a remotely controlled vehicle, or a combination thereof, and
   where the vehicle transmits required information to the central processing database in lieu of the responding driver, requesting driver, or both.

8. The method of claim 3, where the smart phone comprises a smart cellular phone, a tablet, a laptop, or any portable or fixed to an automobile computing platform able to communicate with the central processing database via internet, satellite, cellular phone system antenna towers, or a combination thereof.

9. The method of claim 4, where the smart phone comprises a smart cellular phone, a tablet, a laptop, or any portable or fixed to an automobile computing platform able to communicate with the central processing database via internet, satellite, cellular phone system antenna towers, or a combination thereof.

10. The method of claim 6, where the central processing database removal of the selected available parking space from the available parking spaces list at the location vicinity is time limited, and the requesting driver authorized fee is transferred to the responding driver and parking exchange application, if the requesting driver does not cancel the selection of the available parking space within a predetermined time period and does not arrive at the available parking space within the time limit, furthermore, the central processing database continuously monitors the location of the responding driver car at the selected available parking space, if the responding driver drives the responding driver car away from the selected available parking space for more than 0.2 miles before the time limit period expires and before the requesting driver acknowledges the responding driver car for completion of transaction, the central processing database will remove the selected available parking space from the database, and informs the requesting driver of unavailability of the selected available parking space and cancels requesting driver fee authorization.

11. A system for securing a parking space, comprising:
a responding driver in a car equipped with a smart phone using a parking exchange application,
a requesting driver in a car equipped with a smart phone using the parking exchange application,
a central processing database in communication with the smart phones using parking exchange applications,
where an address of an available parking space temporarily occupied by the responding driver car, a requested fee for releasing the available parking space, and a time duration of how long the responding driver will be occupying the available parking space, is communicated with the central processing database by the responding driver,
where a request for an available parking space in a location vicinity in exchange for an offered fee is communicated with the central processing database by the requesting driver,
where the central processing database communicates a plurality of available parking spaces addresses in the location vicinity and their corresponding requested fee on a map to the requesting driver,
where the central processing database communicates with the responding drivers the location vicinity and time duration until the requesting driver will get to the location vicinity on the map,
where the central processing database identifies the available parking spaces where the responding driver has accepted the offered fee by the requesting driver,
where the requesting driver selects one of the plurality of the available parking spaces in the location vicinity from the responding drivers who have accepted the offered fee and the responding drivers who have not accepted the offered fee, and authorizes a fee payment as needed for the selected available parking space release,
where the central processing database, removes the selected available parking space from the available parking spaces list in the location vicinity, provides the responding driver car information to the requesting driver, and provides the requesting driver car information to the responding driver,
where the requesting driver drives to the selected available parking space address and upon arriving acknowledges the responding driver car to the central processing database,
where the central processing database authorizes a fee transfer to the responding driver and a commission fee to the parking exchange application from the authorized fee, and
where the responding driver releases the available parking space to the requesting driver.

12. The system of claim 11, where the smart phone comprises a smart cellular phone, a tablet, a laptop, or any portable or fixed to an automobile computing platform able to communicate with the central processing database via internet and/or cellular phone system antenna towers.

13. The system of claim 11, where the central processing database removal of the selected available parking space from the available parking spaces list at the location vicinity is time limited, and the requesting driver authorized fee is transferred to the responding driver and parking exchange application, if the requesting driver does not cancel the selection of the available parking space within a predetermined time period and does not arrive at the available parking space within the time limit, furthermore, the central processing database continuously monitors the location of the responding driver car at the selected available parking space, if the responding driver drives the responding driver car away from the selected available parking space for more than 0.2 miles before the time limit period expires and before the requesting driver acknowledges the responding driver car for completion of transaction, the central processing database will remove the selected available parking space from the database, and informs the requesting driver of unavailability of the selected available parking space and cancels requesting driver fee authorization.

14. The system of claim 11, where the responding driver car, requesting driver car, or both further comprise an autonomous vehicle, a remotely controlled vehicle, or a combination thereof, and where the vehicle transmits required information to the central processing database in lieu of the responding driver, requesting driver, or both.

15. A business method for securing a parking space comprising:
a parking exchange application charging a commission fee for securing an available parking space for a requesting driver,
where a responding driver, temporarily occupying the available parking space, releases the available parking space to the requesting driver for a transfer fee,
where the responding driver using a smart phone with the parking exchange application informs a central processing database of the parking space address and a requested fee for releasing the available parking space,
the requesting driver using a smart phone with the parking exchange application inquire from the central processing database about available parking spaces in a location vicinity along with an offered fee in exchange for the available parking space, the central processing database provides a plurality of parking space addresses, occupied by responding drivers, in the location vicinity along with their corresponding requested fee on a map to the requesting driver, the central processing database further provides the location vicinity and the estimated arrival time of the requesting driver along with the offered fee on the map to the responding drivers, where the central processing database identifies the available parking space addresses of the responding drivers who accept the offered fee on the map to the requesting driver, where the requesting driver selects one of the plurality of parking addresses from responding drivers who have accepted the offered fee and the responding drivers who have not accepted the offered fee, authorizing a fee payment for release of the selected available parking space, and drives to the available parking space, the central processing database, provides information on requesting driver car to the responding driver at the selected available parking space address, and provides information on responding driver car at the selected available parking space address to the requesting driver, when the requesting driver arrives at the available parking space address and acknowledges the responding driver car, the central processing database releases the transfer fee to the responding driver and charges the commission fee for the parking exchange application from the authorized fee payment, and the responding driver releases the available parking space to the requesting driver.

16. The business method of claim 15, where the responding driver using a smart phone equipped with a map application, identifying the parking space address, uses the parking exchange application informing the central processing database of the parking space address, responding driver car information, the requested fee, and receiving information from the central processing database on the requesting driver car information and information on the authorized fee.

17. The business method of claim 16, where the responding driver car, requesting driver car, or both further comprise an autonomous vehicle, a remotely controlled vehicle, or a combination thereof, and where the vehicle transmits required information to the central processing database in lieu of the responding driver, requesting driver, or both.

18. The business method of claim 15, where the requesting driver using the smart phone equipped with the parking exchange application, providing information on requesting driver car, and the offered fee for securing an available parking space to the central processing database, inquiring from the central processing database about available parking spaces in the location vicinity, receiving the plurality of available parking spaces address, selecting one of the plurality of parking addresses, authorizing the fee payment, and upon arriving at the available parking address acknowledging the responding driver car.

19. The business method of claim 15, where when the requesting driver selects the available parking space, the central processing database removes the selected available parking space from the available parking spaces list at the location vicinity.

20. The business method of claim 19, where the central processing database removal of the selected available parking space from the available parking spaces list at the location vicinity is time limited, and the requesting driver authorized fee is transferred to the responding driver and parking exchange application, if the requesting driver does not cancel the selection of the available parking space within a predetermined time period and does not arrive at the available parking space within the time limit, furthermore, the central processing database continuously monitors the location of the responding driver car at the selected available parking space, if the responding driver drives the responding driver car away from the selected available parking space for more than 0.2 miles before the time limit period expires and before the requesting driver acknowledges the responding driver car for completion of transaction, the central processing database will remove the selected available parking space from the database, and informs the requesting driver of unavailability of the selected available parking space and cancels requesting driver fee authorization.

21. The business method of claim 15, where the central processing database suggests to the responding drivers the fee required for releasing the available parking space, based on demand for the available parking space through analysis of local traffic flow, presence of a local event attracting drivers in need of the available parking space, local ongoing construction activity limiting available parking spaces, local weather conditions, local government advisories affecting traffic flow, or a combination thereof.

* * * * *